SEALED MAGNETIC MEMORY ASSEMBLY

Filed Dec. 16, 1963 2 Sheets-Sheet 1

INVENTOR.
ALEX J. BIELSKI

BY James and Franklin

ATTORNEYS

SEALED MAGNETIC MEMORY ASSEMBLY

Filed Dec. 16, 1963 2 Sheets-Sheet 2

INVENTOR.
ALEX J. BIELSKI
BY James and Franklin
ATTORNEYS 3,325,798
SEALED MAGNETIC MEMORY ASSEMBLY
Alex J. Bielski, Calabasas, Calif., assignor to General Instrument Corporation, Newark, N.J., a corporation of New Jersey
Filed Dec. 16, 1963, Ser. No. 330,846
20 Claims. (Cl. 340—174.1)

The present invention relates to the construction of a memory assembly, and is particularly oriented toward sealing the interior thereof against the entry of deleterious substances.

Magnetic memory units comprise a traveling recording medium moved past transducing heads, electrical connections being made to those heads so that they can be used either to record signals on the recording medium or reproduce signals previously recorded thereon. In a typical embodiment of such a device, such as is shown in my pending patent application Ser. No. 216,804, filed Aug. 14, 1962, now U.S. Patent No. 3,158,848, the recording medium is in the form of a continuously rotated magnetizable drum having a large number of individual magnetic tracks thereon, a comparable number of transducing heads being mounted on the device for operative association with said tracks respectively. Since these devices are used for the storing of intelligence in a condition where each item of "remembered" or stored intelligence can be reproduced at will, one limiting factor of devices of this type is the number of items of intelligence which can be stored at a given time. This calls for maximization of the number of circumferential tracks on the magnetizable drum. Each of such tracks can be used to store a number of items of information, provided that the relative position between said tracks and the transducing head associated therewith is accurately known, so that the desired item of information, and not some other item of information on the same track, can be reproduced upon command. Consequently at least one transducing head, and usually more than one, is provided for each track, and the circumferential position of those heads must be precisely adjustable relative to the recording medium in order to provide for proper timing. Individual electrical connections must be made to each transducing head, but without interfering with the adjustable positioning of that head as indicated above.

As shown in my aforementioned pending patent application Ser. No. 216,804, the magnetizable drum is mounted for rotation within an enclosing housing wall. The wall is provided with a plurality of accurately located apertures extending therethrough, in which apertures the individual transducing heads are adapted to be received. The apertures in which the transducing heads are received are arranged in substantially axially aligned groups, each group being circumferentially spaced from adjacent groups.

While apertures in the housing wall through which the transducing heads pass are necessary in order to permit adjustable positioning of the recording heads relative to the magnetizable drum, their existence involves undesired effects. They define openings or passageways through which dirt, dust and grit can make their way to the exposed surface of the rotated drum, where they produce "noise" which interferes with accurate recording and in some instances cause actual physical damage to the highly polished surface of the drum. Moreover, deleterious ambient atmospheric effects, such as moisture or corrosive constituents, also gain access to the interior of the assembly through those apertures. When the memory drum assembly is operated under ideal conditions, as in an air conditioned room, these matters are not particularly serious. However, when the memory drum is operated under less protected conditions, as in a mobile out-of-doors installation, the problems of "noise," corrosion and the like become quite meaningful. In such situations it is virtually required that the interior of the memory drum assembly be sealed, or that it be operated in an artificial atmosphere, or that the entry of air thereinto be along a predetermined path permitting control of the moisture and dust content thereof.

Sealed housings for memory drum assemblies of this type have been made in the past. They have, however, suffered from the significant drawback of requiring a major disassembly operation every time that the adjustment of any one of the several hundred transducing heads on the assembly had to be checked or altered, and they usually also require dislocation of at least some of the electrical connections to the transducing heads. This has been a source of considerable trouble and expense, since adjustment or checking of individual recording heads is a fairly frequent occurrence.

It is the prime object of the present invention to devise a construction which will permit the sealing of the interior of a memory drum assembly without adversely affecting the adjustable positioning of the transducing heads. If a further prime object of the present invention to devise such a construction which will permit ready access to the particular heads adjustment or checking of which is required, and to permit such adjustment or checking to take place, all without requiring any dislocation of the electrical connections to any of the heads.

The above objectives are accomplished by providing the outer housing wall with one or more recessed areas, the apertures through which the individual recording heads extend being included inside those recessed areas. A sealing member is more or less permanently mounted in each recessed area so as to make sealing engagement therewith, each sealing member having a central opening or openings in registration with the transducing heads and the housing apertures in which those heads are mounted. Access to the heads for adjustment purposes is accomplished through said openings in the sealing member. A portion of the sealing member extends out beyond the housing wall, and electrical terminal means are carried thereby, said terminal means communicating between the opening in the sealing member and the outer surface of the outwardly extending portion of the sealing member. The inner portions of the terminal means are electrically connected to the recording heads and the outer portions thereof are connected in any appropriate manner to external circuitry. Cover means are provided for each of the sealing members, those cover means being readily attachable to and removable from the sealing members and, when attached, making sealing engagement therewith and closing the access openings to the recording heads. When adjustment of a given head is required, all that is needed is to remove the appropriate cover means from its corresponding sealing member, thus exposing the opening in the sealing member and permitting access to the transducing head in question. It is significant that this may be done without requiring any modification or manipulation of the electrical connections to any of the transducing heads, those connections being permanently accomplished by the terminal means carried by and passing through the permanently affixed sealing members.

In order to achieve a truly effective seal and at the same time facilitate assembly of the sealing members with the housing wall and the ready removability and attachment of the cover means, the sealing members are adapted to be telescopically received inside the recessed areas of the housing wall and the cover means are adapted to be telescopically received inside inset areas formed in the outer portions of the sealing members. The inner telescoped parts are provided with peripheral grooves in which compressible sealing rings are received, those rings engaging, being compressed by, and making effective sealing engagement with the walls within which they are adapted to be telescoped.

The construction in question is comparatively inexpensive, does not require manufacture to any particularly high degree of dimensional tolerance, greatly facilitates maintenance and adjustment of the memory assembly ensures the security of electrical connections, and produces a highly effective air-tight seal.

To the accomplishment of the above, and to such other objects as may hereinafter appear, the present invention relates to the construction of a sealed memory assembly, as defined in the appended claims, and as described in this specification, taken together with the accompanying drawings, in which:

Figures 1, 2:
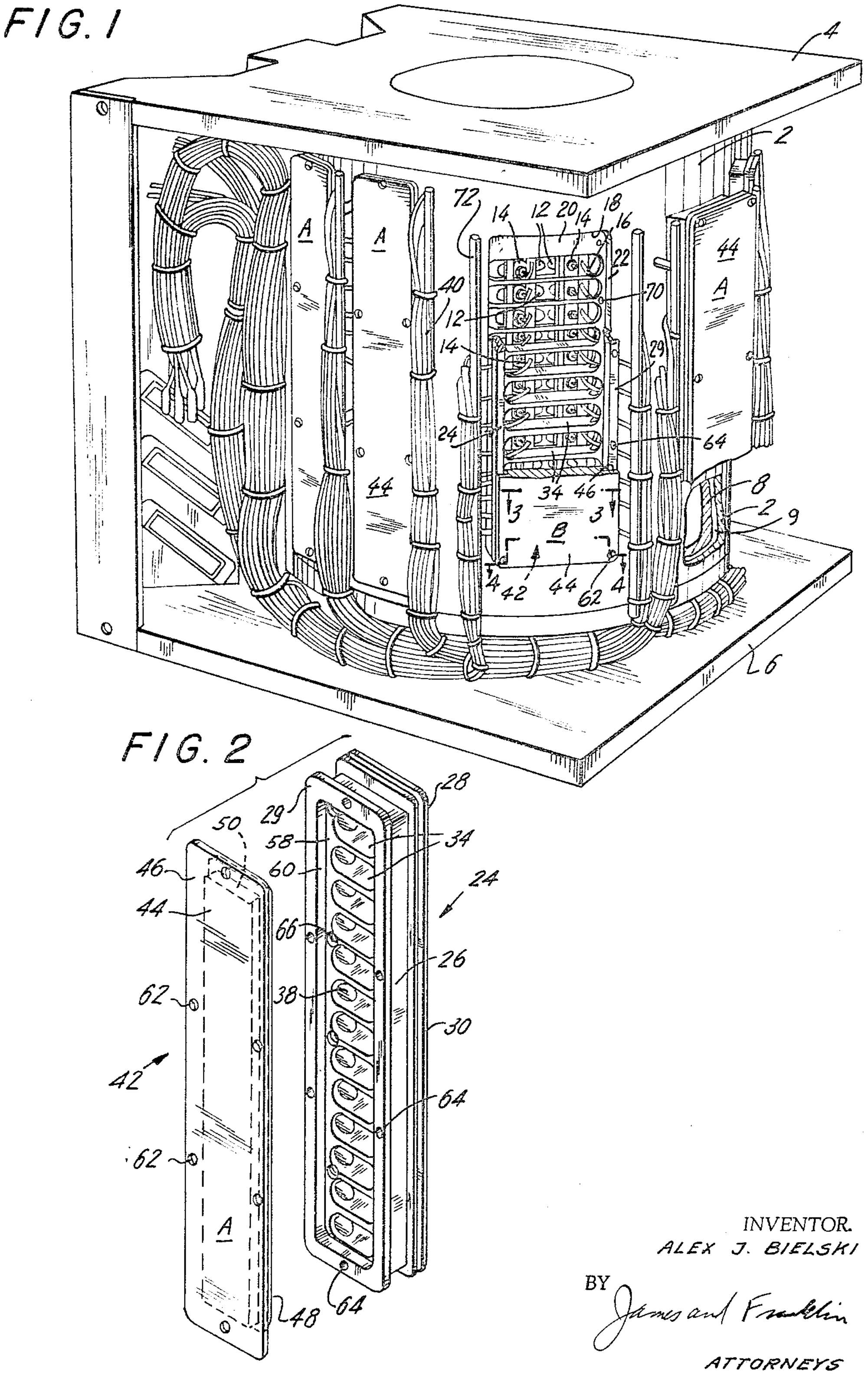
FIG. 1 is a three-quarter perspective view of a typical embodiment of the present invention, certain portions thereof being broken away for illustrative purposes.
FIG. 2 is a three-quarter perspective exploded view of a sealing member and the cover means therefor.

Having reference first to FIG. 1, the recording assembly comprises a generally cylindrical housing 2 having upper and lower end closure plates 4 and 6. Rotatively mounted within the housing 2, and driven in rotation in any appropriate manner, is a magnetizable element in the form of a drum 8 (see FIGS. 1 and 3) the outer magnetizable surface 9 of which is closely positioned relative to the inner surface 10 of the housing wall 2. The manner of mounting and driving of the drum 8 forms no part of the present invention and may, for example, be comparable to that shown in the aforementioned pending application Ser. No. 216,804.

Also as shown in detail in said pending application Ser. No. 216,804, the housing wall 2 may be provided with a plurality of apertures 12 in each of which an individual transducing head, generally designated 14, is adapted to be mounted. These apertures 12 are preferably arranged in substantially axially aligned groups of apertures, the apertures 12 of each group being axially spaced from one another and each group of apertures being circumferentially spaced from adjacent groups of apertures. The apertures 12, or at least some of them, assume different axial positions on the housing wall 2 so as to cooperate with different axially positioned recording tracks on the drum 8. If desired, some of the apertures 12 may have the same axial location but with different circumferential locations, so as to cooperate, at any given instant, with different circumferential portions of a given recording track on the drum 8.

Figure 3:
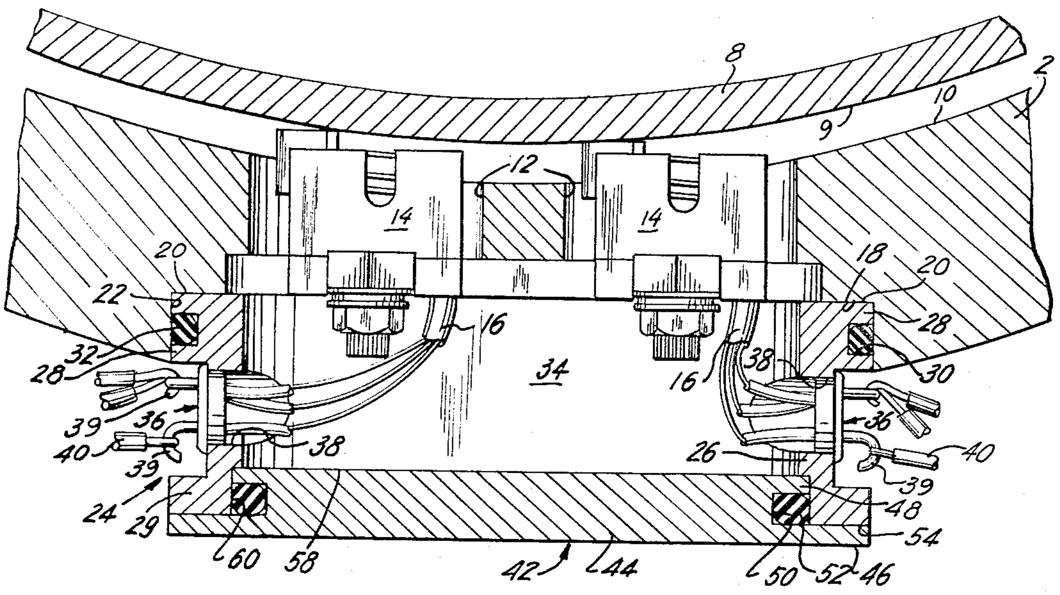
FIG. 3 is a cross sectional view, on an enlarged scale, taken along the line 3—3 of FIG. 1.
Figure 4:
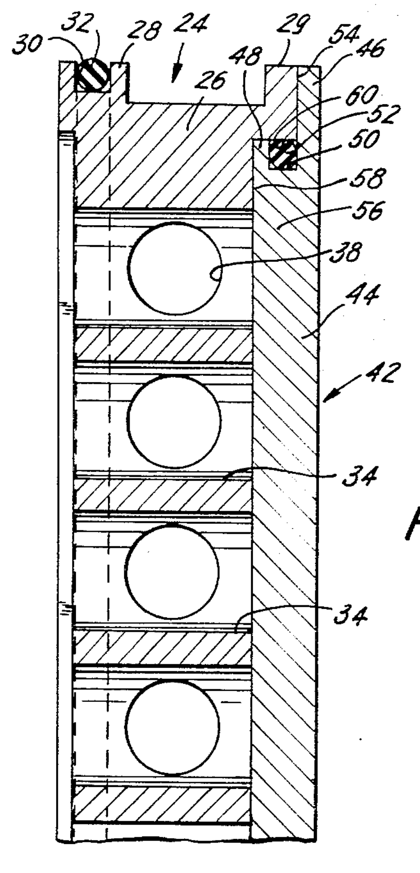
FIG. 4 is a cross sectional view taken along the line 4—4 of FIG. 1 and showing the cover means in assembled position.
Figure 5:
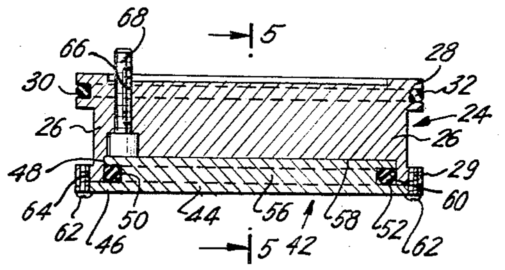
FIG. 5 is a cross sectional view on an enlarged scale taken along the line 5—5 of FIG. 4.

The apertures 12 are, as best shown in FIG. 3, circumferentially elongated relative to the transducing heads 14, thereby permitting the adjustable positioning of the heads 14 therealong by any appropriate structure. Electrical leads 16 extend from the transducing heads 14, as is conventional.

The existence of the apertures 12 permit dust, dirt, grit, moisture and other corrosive or deleterious agents to pass therethrough into the space inside the housing wall 2. In order to protect the interior of the memory assembly from such agents, it is necessary that the apertures 12 be sealingly blocked. The means employed to effect this sealing should, however, as indicated above, make for ready access to the individual transducing heads 14 without adversely affecting the electrical connections made thereto.

In accordance with the present invention each axially aligned group of apertures 12, or a plurality of circumferentially adjacent groups of such apertures 12, are all located circumferentially inside a recessed area 18 which is formed in the radially outer surface of the housing wall 2, said recessed area 18 having a bottom wall 20 and an outer circumferential wall 22.

For each recessed area 18 there is a sealing member generally designated 24. This sealing member 24 has a peripheral shape corresponding to that of the recessed area 18 into which it is adapted to be received. It comprises side walls 26, a bottom flange 28 and a top flange 29. The bottom flange 28 has a thickness corresponding to the depth of the recessed area 18 and a peripheral contour closely corresponding to the contour of the circumferential wall 22, the flange 28 being adapted to be received inside the circumferential wall 22 and to rest on the bottom wall 20. The flange 28 is provided with a peripheral groove 30 within which a sealing ring 32 is received, that ring normally extending out radially somewhat from the flange 28 so as to be engaged and compressed by the circumferential wall 22 of the recessed area 18 of the housing 2 when the sealing member 24 is inserted thereinto, thereby to produce a reliable and effective air-tight seal.

The space between the side walls 26 of the sealing member 24 is opened so as to expose the transducing heads 14 and the body apertures 12 in which they are mounted. As here specifically disclosed a plurality of through openings 34 are formed in the sealing member 24, each registering with at least one body aperture 12. It will be noted from FIG. 1 that two types of sealing members 24 are disclosed, one type being designated A in FIG. 1 and being of comparatively narrow width and another type being designated B in FIG. 1 and being of comparatively wide width. The type A units (see FIG. 2) are adapted to register with and expose only a single axial row of apertures 12, whereas the type B units (see FIG. 3) are adapted to register with and expose a pair of circumferentially adjacent groups of apertures 12. Thus in the type A unit the width of the apertures 34 corresponds to the width of a single body aperture 12, whereas in the type B unit the width of the apertures 34 corresponds to the distance between the extreme ends of a pair of circumferentially adjacent body apertures 12.

The side walls 26 of the sealing members 24 carry terminal means, generally designated 36, these terminal means passing through, and being sealingly mounted in, apertures 38 formed in its side walls 24. The specific nature of the terminal means 36 forms no part of the present invention, provided only that they permit the making of electrical connection through the side walls 26, so that the leads 16 from the transducing heads 14 can be permanently electrically connected to appropriate terminal elements 39 exposed on the outside of the sealing member 24. Leads 40 from external circuitry are adapted to be connected to the terminal elements 38 in any appropriate manner, thereby to complete the electrical circuit.

In the type A unit adapted to cooperate only with a single line of recording heads 14, the terminal means 36 are preferably provided only along one side wall 26, the other side wall thereof being imperforate (see FIG. 2). On the other hand, in the type B unit adapted to cooperate with two axial rows of recording heads 14, each side wall 26 carries its own set of terminal means 36, each such set being electrically connected to the transducing heads 14 in a different axial row (see FIG. 3).

The cover means, generally designated 42, comprises a top wall 44 having a flange 46 extending out beyond an unflanged portion 48. The unflanged portion is provided with a peripheral groove 50 in which a sealing ring 52 is received, that ring normally extending out beyond the periphery of the unflanged portion 48. The radially outer section of the sealing member 24 is provided with an end wall 54 which surrounds an inset area 56, that area having a bottom wall 58 and a circumferential wall 60. The unflanged portion 48 of the cover means 42 is adapted to fit snugly within the inset area 56 of the sealing member 24, resting on the bottom wall 58 thereof and with its sealing ring 52 engaged and compressed by the circumferential wall 60 thereof, while at the same time the flange 46 of the cover means 42 rests on the end wall 54 of the sealing means 24.

In order to retain the cover means 42 on the sealing means 24 in sealing relationship thereto, the sealing means flange 46 carries one or more securing screws 62 adapted to be received within tapped holes 64 formed in the end wall 54 of the sealing member 24. In order to secure the sealing member 24 to the housing wall 2, the sealing member 24 is provided with a plurality of openings 66 through which securing screws 68 are adapted to pass, those screws being threadedly received in tapped apertures 70 formed in the housing wall 2, preferably between axially adjacent apertures 12.

The housing wall 2 may carry guide rods 72 on the exterior thereof closely adjacent to the terminal means 36 on the exposed portions of the side walls 26 of the sealing members 24, thereby to support and guide the many leads 40 which must be utilized to make the myriad of electrical connections involved in the operation of the memory drum assembly.

Both the sealing member 24 and the cover means 42 may be easily and inexpensively manufactured, and the dimensional tolerances involved in that manufacture are not particularly onerous. The sealing members 24 may readily be positioned and secured in the corresponding recessed areas 18 of the housing walls 2, and they will form an effective and reliable air-tight seal therewith by virtue of the action of the sealing ring 32. The cover means 42 may similarly be easily assembled to and secured on their respective sealing means 24 and, by virtue of the sealing rings 52, will form an effective and reliable air-tight seal therewith.

The tightening of the securing screws 66 will pull the sealing members 24 into close engagement with the bottom wall 20 of the recessed area 18, thus enhancing the effectiveness of the seal formed between the sealing member 24 and the housing 2. The action of the securing screws 62 carried by the cover means 42 will, by drawing the flange 46 into close engagement with the end wall 54 of the sealing member 24, enhance the effectiveness of the seal produced between those two elements.

When access to a particular transducing head 14 is required, it is necessary to remove only the cover means 42 corresponding to that group of heads 14 which includes the one in question. The sealing member 24 which is involved will remain in place, and hence the electrical connections to all of the heads 14 remain inviolate. However, the openings 34 through that sealing member 24 are exposed, and access is thereby provided to the heads 14 in the body apertures 12, permitting adjustment, replacement, or repair as desired. When the required operation has been completed all that need be done is to replace the cover means 42. It will be apparent that the disassembly time required to make an adjustment is therefore minimized, the possibility of dislocation or damage to electrical connections is virtually eliminated, and yet the memory assembly is permitted to operate in a sealed condition, or in a condition of carefully controlled ventilation or circulation.

Although the invention has been here specifically disclosed in connection with the specific type of memory drum assembly construction shown in my pending application Ser. No. 216,804, and while only a limited number of specific embodiments of the improved sealing structure are here disclosed, it will be apparent that many variations may be made therein, all without departing from the spirit of the invention as defined in the following claims.

I claim:

1. In a sealed memory assembly comprising a housing, a recording member movably mounted inside said housing, and a plurality of transducing heads mounted on said housing and operatively associated with said recording member, said heads having electrical connections thereto, said housing having a group of apertures extending through said housing from the outside to the inside thereof, through which apertures said transducing heads respectively extend; the improvement which comprises said housing having a recessed area extending from the outside thereof toward the inside thereof, said group of apertures being formed circumferentially inside said recessed area, said recessed area defining a circumferential wall, a sealing member having a depth greater than that of said recessed area, said sealing member being sealingly received in said recessed area inside said circumferential wall thereof and having a portion extending out from said recessed area, the radially inner portion of said sealing member being opened so as to expose said transducing heads in said housing apertures, electric terminal means passing through said sealing member, exposed at the outwardly extending portion and at the radially inner opening of said sealing member, and adapted to be electrically connected to said heads and to external circuitry, and cover means removably sealingly mounted on said sealing member so as to close and seal the open radially inner portion thereof, thereby when removed to expose the heads corresponding thereto without affecting the electrical connection to said heads.

2. The memory assembly of claim 1, in which said opening in said central portion of said sealing member defines a plurality of openings each registering with a corresponding aperture in said housing.

3. The memory assembly of claim 2, in which that portion of said sealing member which is received in said recessed area of said housing has a groove on the radially outer surface thereof, and a sealing ring received in said groove and normally extending radially outwardly therefrom, said sealing ring being engaged and compressed by said circumferential wall of said recessed area to form a seal therewith.

4. The memory assembly of claim 2, in which said outwardly extending portion of said sealing member terminates outwardly in an outer wall which surrounds an inset area having a circumferential wall, said cover means having a part sealingly received within said inset area and a flange overlying and removably secured to said outer wall of said sealing member.

5. The memory assembly of claim 2, in which the outwardly extending portion of said sealing member terminates outwardly in an outer wall surrounding an inset area having a circumferential wall, said cover means having a part received within said inset area and a flange overlying and removably secured to said outer wall of said sealing member, said part of said cover means having a groove on the radially outer surface thereof, and a sealing ring received in said groove and normally extending radially outwardly therefrom, said sealing ring being engaged and compressed by said inset area circumferential wall to form a seal therewith.

6. The memory assembly of claim 2, in which that portion of said sealing member which is received in said recessed area of said housing has a groove on the radially outer surface thereof, a sealing ring received in said groove and normally extending radially outwardly therefrom, said sealing ring being engaged and compressed by said circumferential wall of said recessed area to form a seal therewith, said outwardly extending portion of said sealing member terminating outwardly in an outer wall surrounding an inset area having a circumferential wall, said cover means having a part sealingly received within said inset area and a flange overlying and removably secured to said outer wall of said sealing member.

7. The memory assembly of claim 2, in which that portion of said sealing member which is received in said recessed area of said housing has a groove on the radially outer surface thereof, a sealing ring received in said groove and normally extending radially outwardly therefrom, said sealing ring being engaged and compressed by said circumferential wall of said recessed area to form a seal therewith, said outwardly extending portion of said sealing member terminating outwardly in an outer wall surrounding an inset area having a circumferential wall, said cover means having a part sealingly received within said inset area and a flange overlying and removably secured to said outer wall of said sealing member, said part of said cover means having a groove on the radially outer surface thereof, and a sealing ring received in said groove and normally extending radially outwardly therefrom, said sealing ring being engaged and compressed by said inset area circumferential wall to form a seal therewith.

8. The memory assembly of claim 1, in which that portion of said sealing member which is received in said recessed area of said housing has a groove on the radially outer surface thereof, and a sealing ring received in said groove and normally extending radially outwardly therefrom, said sealing ring being engaged and compressed by said circumferential wall of said recessed area to form a seal therewith.

9. The memory assembly of claim 8, in which said outwardly extending portion of said sealing member terminates outwardly in an outer wall which surrounds an inset area having a circumferential wall, said cover means having a part sealingly received within said inset area and a flange overlying and removably secured to said outer wall of said sealing member.

10. A memory assembly of claim 8, in which the outwardly extending portion of said sealing member terminates outwardly in an outer wall surrounding an inset area having a circumferential wall, said cover means having a part received within said inset area and a flange overlying and removably secured to said outer wall of said sealing member, said part of said cover means having a groove on the radially outer surface thereof, and a sealing ring received in said groove and normally extending radially outwardly therefrom, said sealing ring being engaged and compressed by said inset area circumferential wall to form a seal therewith.

11. The memory assembly of claim 1, in which said outwardly extending portion of said sealing member terminates outwardly in an outer wall which surrounds an inset area having a circumferential wall, said cover means having a part sealingly received within said inset area and a flange overlying and removably secured to said outer wall of said sealing member.

12. The memory assembly of claim 11, in which said part of said cover means received within said inset area of said sealing member has a groove on the radially outer surface thereof, and a sealing ring received in said groove and normally extending radially outwardly therefrom, said sealing ring being engaged and compressed by said circumferential wall of said sealing member inset area to form a seal therewith.

13. In a sealed memory assembly comprising a housing, a recording member movably mounted inside said housing, and a plurality of transducing heads mounted on said housing and operatively associated with said recording member, said heads having electrical connections thereto, said housing having a group of elongated apertures extending through said housing from the outside to the inside thereof, through which apertures said transducing heads respectively extend and along which they are adjustably positionable; the improvement which comprises said housing having a recessed area extending from the outside thereof toward the inside thereof, said group of apertures being formed circumferentially inside said recessed area, said recessed area defining a circumferential wall, a sealing member having a depth greater than that of said recessed area, said sealing member being sealingly received in said recessed area inside said circumferential wall thereof and having a portion extending out from said recessed area, the radially inner portion of said sealing member being opened so as to expose said transducing heads in said housing apertures over the range of adjustable positioning of said heads along said apertures, electric terminal means passing through said sealing member, exposed at the outwardly extending portion and at the radially inner opening of said sealing member, and adapted to be electrically connected to said heads and to external circuitry, and cover means removably sealingly mounted on said sealing member so as to close and seal the open radially inner portion thereof, thereby when removed to expose the heads corresponding thereto for adjustment without affecting the electrical connection to said heads.

14. The memory assembly of claim 13, in which said opening in said central portion of said sealing member defines a plurality of elongated openings each registering with a corresponding elongated aperture in said housing.

15. The memory assembly of claim 13, in which that portion of said sealing member which is received in said recessed area of said housing has a groove on the radially outer surface thereof, and a sealing ring received in said groove and normally extending radially outwardly therefrom, said sealing ring being engaged and compressed by said circumferential wall of said recessed area to form a seal therewith.

16. The memory assembly of claim 15, in which said outwardly extending portion of said sealing member terminates outwardly in an outer wall which surrounds an inset area having a circumferential wall, said cover means having a part sealingly received within said inset area and a flange overlying and removably secured to said outer wall of said sealing member.

17. The memory assembly of claim 15, in which the outwardly extending portion of said sealing member terminates outwardly in an outer wall surrounding an inset area having a circumferential wall, said cover means having a part received within said inset area and a flange overlying and removably secured to said outer wall of said sealing member, said part of said cover means having a groove on the radially outer surface thereof, and a sealing ring received in said groove and normally extending radially outwardly therefrom, said sealing ring being engaged and compressed by said inset area circumferential wall to form a seal therewith.

18. In a sealed memory assembly comprising a housing, a recording member movably mounted inside said housing, and a plurality of transducing heads mounted on said housing and operatively associated with said recording member, said heads having electrical connections thereto, said housing having a plurality of groups of apertures extending through said housing from the outside to the inside thereof, through which apertures said transducing heads respectively extend; the improvement which comprises said housing having a similar plurality of recessed areas extending from the outside thereof toward the inside thereof, said groups of apertures being formed circumferentially inside said recessed areas respectively, each of said recessed area defining a circumferential wall, a sealing member for each recessed area having a depth greater than that of the corresponding recessed area, said sealing members being sealingly received in the corresponding recessed areas inside said circumferential walls thereof and having a portion extending out from said recessed areas, the radially inner portion of said sealing members being opened so as to expose the corresponding transducing heads in said housing apertures, electric terminal means passing through said sealing members, exposed at the outwardly extending portion and at the radially inner opening of said sealing members, and adapted to be electrically connected to said heads and to external circuitry, and cover means removably sealingly mounted on each of said sealing members so as to close and seal the open radially inner portion thereof, thereby when removed to expose the heads corresponding thereto without affecting the electrical connection to said heads.

19. The memory assembly of claim 18, in which that portion of said sealing members which is received in said recessed areas of said housing has a groove on the radially outer surface thereof, and a sealing ring received in said groove and normally extending radially outwardly therefrom, said sealing ring being engaged and compressed by said circumferential walls of the corresponding recessed areas to form a seal therewith.

20. The memory assembly of claim 19, in which the outwardly extending portion of said sealing members terminates outwardly in an outer wall surrounding an inset area having a circumferential wall, said cover means having a part received within said inset area and a flange overlying and removably secured to said outer wall of said sealing member, said part of said cover means having a groove on the radially outer surface thereof, and a sealing ring received in said groove and normally extending radially outwardly therefrom, said sealing ring being engaged and compressed by said inset area circumferential wall to form a seal therewith.

References Cited

UNITED STATES PATENTS

| | | | |
|---|---|---|---|
| 3,197,750 | 7/1965 | Smith ------------ | 179—100.2 |
| 3,229,268 | 1/1966 | Solyst ----------- | 340—174.1 |

BERNARD KONICK, *Primary Examiner.*

A. I. NEUSTADT, *Assistant Examiner.*